United States Patent [19]
Ross

[11] 3,817,378

[45] June 18, 1974

[54] METHOD AND APPARATUS FOR FILTERING SOLIDS FROM A LIQUID EFFLUENT

[75] Inventor: David S. Ross, Lorain, Ohio

[73] Assignee: Hydro-Clear Corporation, Avon Lake, Ohio

[22] Filed: Mar. 5, 1973

[21] Appl. No.: 338,198

Related U.S. Application Data

[63] Continuation of Ser. No. 155,482, June 22, 1971, abandoned.

[52] U.S. Cl.............. 210/80, 210/82, 210/104, 210/108, 210/140, 210/274, 210/275
[51] Int. Cl............................ B01d 23/26
[58] Field of Search....... 210/80, 82, 104, 108, 138, 210/140, 274, 410, 275

[56] References Cited
UNITED STATES PATENTS

| | | | |
|---|---|---|---|
| 2,108,168 | 2/1936 | Jenks | 210/82 X |
| 2,785,123 | 3/1957 | Stroud | 210/274 X |
| 3,428,177 | 2/1969 | Duff | 210/108 |
| 3,459,302 | 8/1969 | Ross | 210/80 |
| 3,468,422 | 9/1969 | Camp | 210/274 X |
| 3,506,125 | 4/1970 | Willis et al. | 210/274 X |
| 3,533,507 | 10/1970 | Aitken | 210/274 X |
| 3,563,382 | 2/1971 | Regent | 210/138 X |
| 3,613,888 | 10/1971 | Harris | 210/80 |

FOREIGN PATENTS OR APPLICATIONS

| | | | |
|---|---|---|---|
| 120,867 | 11/1918 | Great Britain | 210/274 |
| 1,117,258 | 5/1956 | France | 210/274 |

Primary Examiner—John Adee
Attorney, Agent, or Firm—Meyer, Tilberry & Body

[57] ABSTRACT

In a sand filter of the type including a filter tank, a layer of particulate material in the tank and forming a filter element having an upper surface, an underdrain cavity generally below the filter element, an effluent inlet above the surface, a filtered effluent outlet connected to the underdrain cavity, means for pumping liquid into the underdrain cavity and upwardly through the filter element, control means for energizing the pumping means for a selected duration at controlled backwash times, a backwash outlet in the tank above the upper surface and means for directing fluid through the backwash outlet during each of the backwash times, there is provided a means for forcing fluid upwardly through the filter element and into the tank at times different from the backwash time to increase the total filtering time between necessary backwashing of the filter.

42 Claims, 9 Drawing Figures

INVENTOR.
DAVID S. ROSS

BY

Meyer, Tilberry & Body
ATTORNEYS

INVENTOR.
DAVID S. ROSS

BY

Meyer, Tilberry & Body
ATTORNEYS

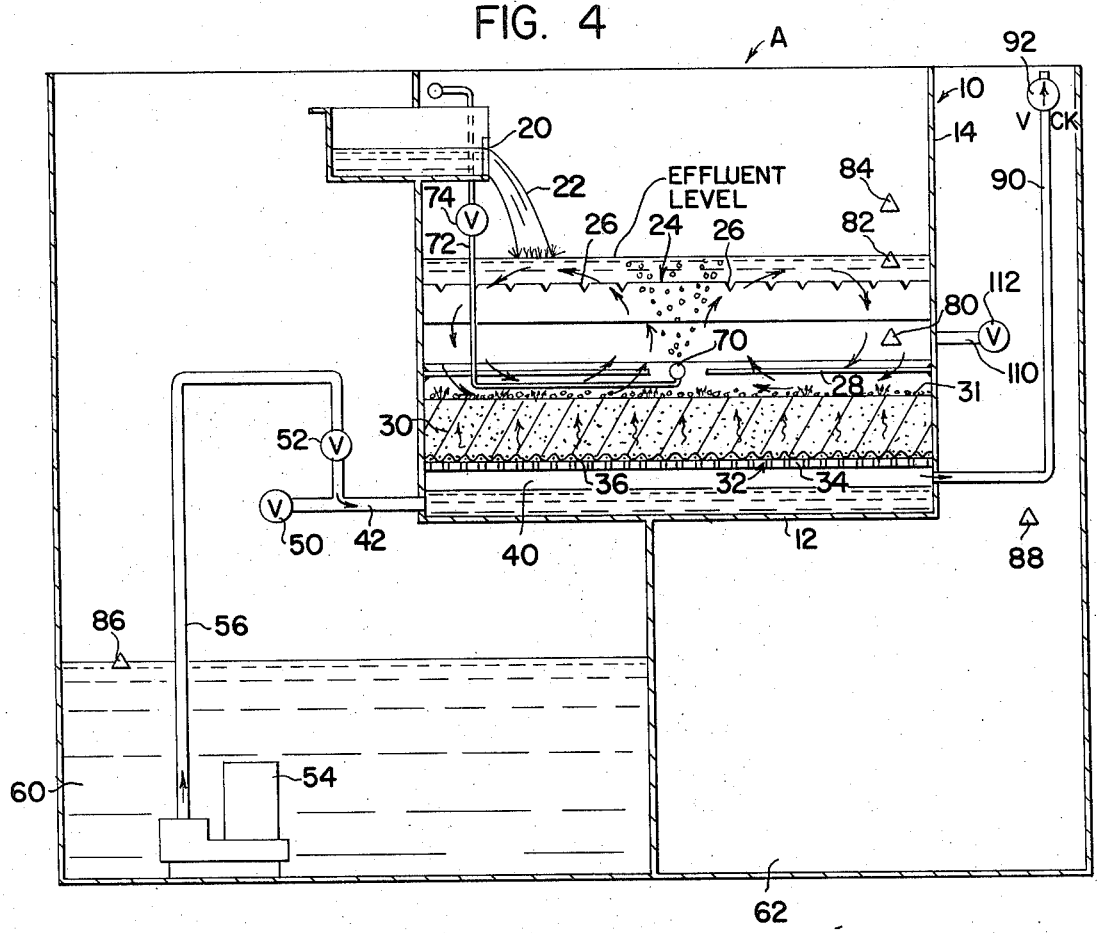

INVENTOR.
DAVID S. ROSS
BY
Meyer, Tilberry & Body
ATTORNEYS

METHOD AND APPARATUS FOR FILTERING SOLIDS FROM A LIQUID EFFLUENT

This is a continuation, of U.S. Pat. application Ser. No. 155,482 filed June 22, 1971, now abandoned.

The present invention pertains to the art of filtering solids from liquid and more particularly to an apparatus and method of filtering solids from a liquid.

The present invention is particularly applicable for filtering solids from a liquid effluent which has been previously treated before the effluent is discharged into a stream or similar repository, and it will be described with particular reference thereto; however, it will be appreciated that the invention has much broader applications and may be used in various installations requiring the removal of solid particles having highly variable physical characteristics from any liquid material.

It is well known that a liquid effluent which is discharged from a waste treatment installation has a highly variable quality. A specific characteristic of this quality is the suspended solids contained in the liquid effluent. These suspended solids are again highly variable in quantity and specific size, and also are variable in substance. The deleterious effect of these suspended solids in any receiving stream is well known, and regulatory agencies have recognized the problem of eliminating these solids, and have, and are continuing to insist that sewage treatment works be designed or ungraded to eliminate these suspended solids in the waste water treatment plant effluent.

A very effective waste water filter has been developed and described in U.S. Pat. No. 3,459,302, issued Aug. 5, 1969, wherein a method of increasing the filtering time of a sand media filter is materially improved by the creating of currents sweeping across the media surface permitting longer filtering runs.

The improvement discussed in the subject patent successfully keeps the filter surface clean; however, fine particles do enter the interstices of the media, and tend to close the passageways created by the interstices until a point is reached that even with a clean surface the media has been plugged requiring that the media be backwashed, eliminating the fine particles that have clogged the media.

The plugging rate of the internal passages or interstices of the media will vary in accordance with the physical characteristics of the suspended solids. Large quantities of these solids will cause the media to plug more frequently, thus requiring more frequent backwashes.

The backwash water containing the suspended solids trapped by the filter must be reprocessed, and the quantity of this backwash water, if excessive, may overload the waste treatment plant hydraulically.

Hydraulic overloads may occur in treatment plants for a number of reasons beyond the control of the operation, causing large quantities of suspended solids to wash out of the plant; and should a substantial quantity of these solids be fine in physical size, frequent clogging of the media will result, and the subsequent backwash, which must be reprocessed, will be added to the hydraulic overload existing and will further accelerate the upset.

An increase in the quantity of suspended solids may occur as described, or at conditions of less than normal hydraulic loading. For example, should the settling characteristics of the solids change, these solids may be carried to the filter with slight hydraulic flows. These major quantities of solids in the plant effluent can occur under varying degrees in hydraulics, but will always be accelerated by an increase in hydraulic load. Therefore, the quantity of backwash water must be kept to minimum, and this can best be accomplished by longer filter runs.

All of the disadvantages of increased frequency of backwash for the above reasons and others, and the resultant high percentage of liquid waste that must be reprocessed are completely overcome by the present invention, which is relatively simple, and may be added or adapted to conventional filters, but ideally to the filtering apparatus and method as described in U.S. Pat. No. 3,459,302, as a major improvement in extending the filtering cycle and reducing the frequency of backwashes.

In accordance with the present invention, there is provided an improvement in a sand filter of the type including a tank, a layer of particulate material in the tank and forming a filter element having an upper surface, and an underdrain cavity generally below the filter element. This improvement includes means for forcing fluid upwardly through the filter element in a direction opposite to the filtering direction at times different from the backwashing cycles of the filter. In this manner, the filtering time of the sand filter is substantially increased.

In accordance with another aspect of the present invention, there is provided a method of operating a sand filter which includes a tank having a sand filter therein, this method comprises the steps of filtering an effluent through the sand filter in a first direction, periodically backwashing the sand filter at spaced backwash stages, and forcing fluid through the sand filter in a second direction opposite to the first direction and between successive backwashing stages. In accordance with the preferred embodiment of the present invention, the fluid which is used between the backwashing stages is air that is pressurized by hydraulic means and driven through the filtered element in the second direction.

By constructing a filtering installation in accordance with the present invention, an improved filtering process is developed. Waste effluent is introduced into the filter cell, impinging on to splash plates, reaerating the effluent, and then onto the surface of the media, where particles of suspended solids, larger than the interstices, are separated from the waste effluent and trapped to the surface. Particles smaller than the interstices enter the many passages (interstices) and are trapped within, but primarily in the top layer. Over a period of time, the surface of the filter may be partially blocked by the separation of these suspended solids causing the water level to rise over the filter surface. With the rise of the liquid level above the media surface, circulation of the liquid is provided by an auxiliary device. This circulation imparts a velocity in a direction not generally concurrent with the filtering direction of the effluent. In this manner, the solids, such as floc and other deleterious materials, are lifted from the surface and held in suspension thus increasing the time the solids are under filtering action. In time, even with this circulation, fine particles will enter the interstices of the filtering media and will cause the media to become clogged to a physical limit which will require the backwashing of the filter to clean the solids therefrom.

It is well known that the clogging within the filter media takes place primarily in the very top layers of the media. As fine particulate matter enters the passages of the media and is trapped therein, these passages are reduced in size due to the partial or complete blockage by trapped particulate matter. The rate that these passages become blocked is a function of the quantity of fine particulate matter in the waste effluent. The clogging of the passages of the filter media will cause the liquid level over the filter media to rise, in a manner similar to the condition caused by the blockage of the media surface by floc and other deleterious materials. The subsequent circulation of the liquid over the filter media will cause the floc to lift and expose interstices not previously clogged. In time these interstices will also become reduced in capacity and cause the liquid level to rise. Upon further rise in the liquid level, an auxiliary device causes the backwash pumps connected to the underdrain cavity to become energized causing previously filtered liquid to rise to the cavity. The rising of this liquid acts as a piston, compressing the air in the cavity.

The compression of this air is relieved by the passage of the air through the interstices from the bottom surface up through the media lifting the plugged media off the surface and exposing unplugged media for continuing filtering action. Upon the lifting of the plugged media from the surface, the backwash pumps are deenergized allowing the liquid piston in the underdrain cavity to drain and permitting continuing filtering action. The circulation of the liquid over the media surface caused by the action of the diffuser holds the encrusted surface in suspension permitting increased filtering capacity.

The compressing of the trapped air in the filter underdrain system is maintained for a short period of time, long enough to blow the crust off of the filter media. This may be considered as a pulse of pressure during the forced circulation of the liquid over the surface and will be referred to hereafter as the "pulsing" of the sand filter.

Pulsing may be repeated on a periodic cycle, thus materially extending the filtering time. This extension of the filtering time further reduces the overall quantity of backwash water required The significance of the length of filtering time cannot be minimized. For example, should a filter surface receive an average of 5 gallons per minute of waste effluent for a period of 60 minutes, 300 gallons of waste effluent would have been filtered. Should backwashing be required at the end of 60 minutes, and 12 gallons per minute of filtrate be required to backwash the filter, and 5 minutes of backwashing time be required, 60 gallons of filtrate would be used for backwashing or 20 percent of the total waste effluent would have to be reprocessed. However, should the filtering process be extended from 60 minutes to 240 minutes, 1,200 gallons would have been filtered and using the same quantity for backwash of 60 gallons, only 5 percent of the waste effluent would have to be reprocessed.

Repeated tests have indicated that the pulsing system, in accordance with the present invention, extends the period between required backwashing of the same wastes by 3 to 6 times that which is experienced in filters of the same design that do not employ the pulsing system.

The ideal arrangement suggests the use of air only as a pulsing medium, for the air passing through the media does not cause reduction in the effectiveness of the filter media and a very high degree of filtration is maintained. This same technique may utilize water as the pulsing vehicle which may disturb the filter surface and fold the solids into the media exposing clean surfaces. However, a limited number of pulses may be employed before some breakthrough of solids to the underdrain may develop.

All waste treatment plants experience upsets in operation that will discharge excessive solids to the waste effluent. These upsets can cause plugging of a filtering device and result in bypassing the filter. This obviates the usefulness of the filter. The upsets may force systems even with the liquid circulation devices to backwash more frequently than desirable. All of these disadvantages may be overcome by use of this simple and effective method of filtration.

As is well known, the effluent quality is quite variable. There are periods of operation during which primarily larger particles of floc are present in the waste effluent; and, therefore, the liquid circulation devices without the pulsing system of the present invention are quite satisfactory, therefore, another object of this invention is the automatic recognition of the quality of the waste effluent and selective use of the pulsing system only when such system is required. This is accomplished by auxiliary devices that measure the rise in liquid level. A rapid rise indicates that a large volume of small particles has been able to enter the passages of the media during the period that the liquid circulation devices are employed.

The primary object of the present invention is the provision of a method and apparatus for filtering a waste effluent through a sand filter, which method and apparatus extends the time between backwashing of the filter.

Yet another object of the present invention is the provision of a method and apparatus for filtering a waste effluent through a sand filter, which method and apparatus pulses fluid through the filter between the backwashing stages.

Another object of the present invention is the provision of a method and apparatus for filtering a waste effluent through a sand filter, which method and apparatus pulses fluid through the filter between the backwashing stages, and in which the pulsing is controlled by the quality of the effluent entering the filter.

Yet another object of the present invention is the provision of a method and apparatus for filtering a waste effluent through a sand filter, which method and apparatus pulses air for short periods between the backwashing stages to prolong the filtering time of the filter.

These and other objects and advantages will become apparent from the following description taken together with the accompanying drawings in which:

FIG. 4 is a cross-sectional side view similar to FIG. 1 showing a further operating condition;

Figure 1:
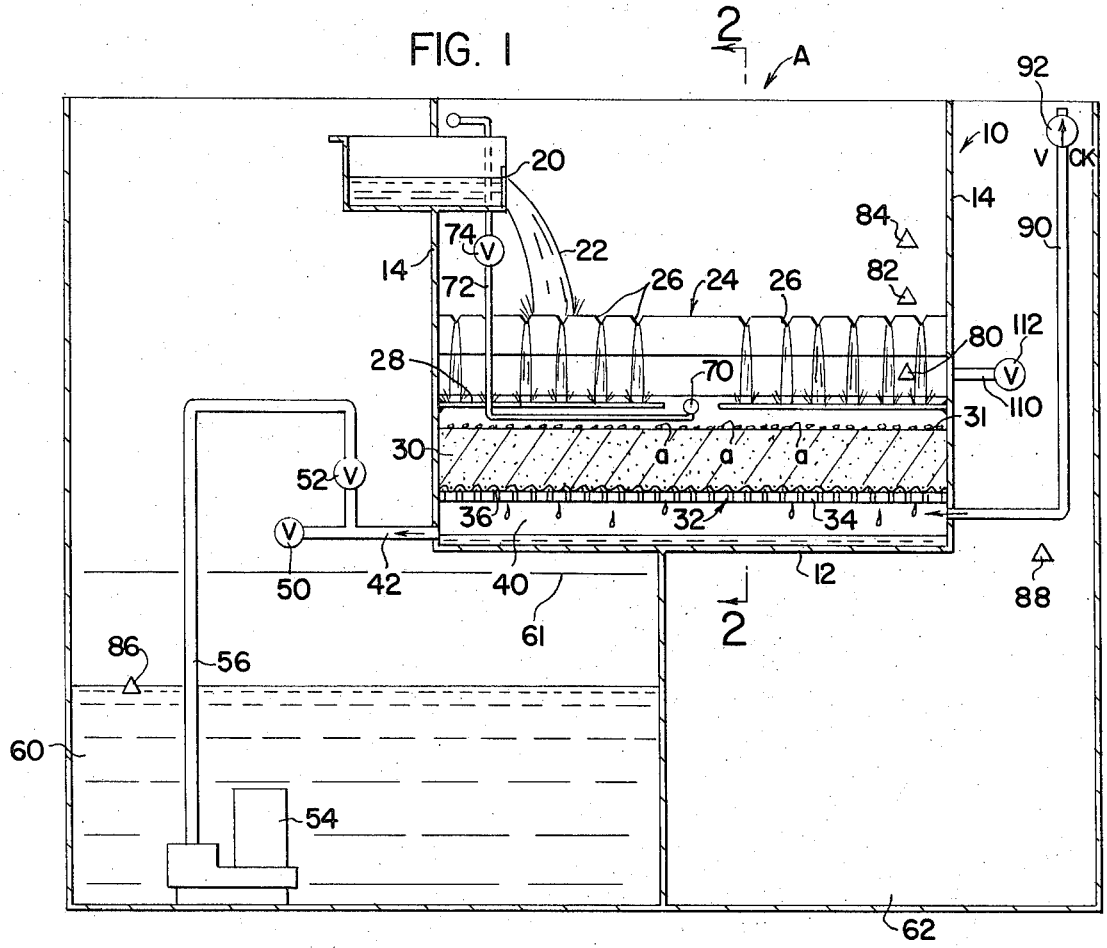
FIG. 1 is a side elevational view showing, somewhat schematically, the preferred embodiment of the present invention.
Figure 2:
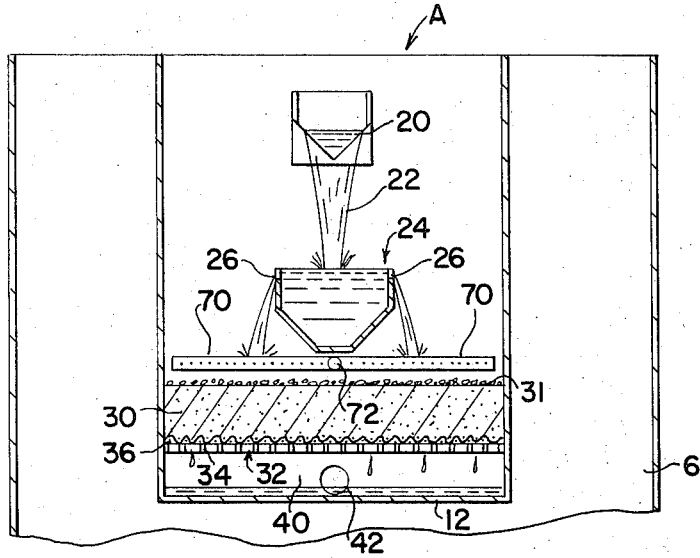
FIG. 2 is a cross-sectional view taken generally along line 2—2 of FIG. 1.

Referring now to the drawings wherein the showings are for the purpose of illustrating a preferred embodiment of the invention only and not for the purpose of limiting same, FIGS. 1 and 2 illustrate a filter unit A including a tank 10 having lower wall 12 and side walls 14. A waste effluent inlet 20 is used for directing effluent 22 into a trough 24 provided with a series of transversely spaced V-shaped notches 26. From the trough 24, the effluent flows over the notches 26 onto a splash plate 28. From there, the effluent passes through a sand filter 30 having an upper surface 31. Of course, a variety of filtering media could be used for the sand filter; however, quartz, anthrafil or ion exchange material is appropriate for the sand bed. This media of the sand filter or sand bed has a particle size sufficient to entrap solids within the effluent as it is passing through the filter.

In accordance with the illustrated embodiment of the present invention, a lower support structure 32 provides a base upon which the sand filter or bed 30 is positioned. This support structure includes a frame 35 and an upper screen 36 having apertures sufficiently small to prevent passage of the sand media downwardly through the screen. Below the screen there is an underdrain 40 having an outlet 42 which is communicated with a valve 50 to allow egress of liquid from the underdrain 40. A second valve 52 is communicated with a pump 54 by a pump conduit 56. By opening valve 50, filtered effluent may pass from the underdrain 40 to a juxtapositioned clear well 60. From there, the filtered effluent is pumped, by a pump not shown, to an appropriate depository, such as a stream. Also, the clear well 60 may have a gravity outlet line. The maximum level 61 of the effluent in the clear well is below the uppermost part of the passage through valve 50.

On the opposite side of the filter A, there is provided a mud well 62 which forms a holding tank for backwashed liquid, in a manner to be described later.

Above the filter surface 31 there is provided an air diffuser 70 to create currents which lift small particles a from the filter 31 during the filtering operation of the filter unit A. An air line 72, communicated with an air valve 74, is used to direct air into the diffuser 70 for injection into the effluent above the sand filter bed 30 after the effluent above the filter is over the diffuser.

In accordance with the illustrated embodiment of the present invention, a series of liquid level sensors, shown as probes 80, 82, 84, 86 and 88 are provided in the filter unit A. As water level exceeds these probes, certain operating conditions occur in a manner to be described later. To prevent creation of a vacuum within the underdrain 40 maximum level 61 in clear well 60 is below the uppermost part of the passage through valve 50. However, there may be provided a vacuum release arrangement which may take a variety of structural forms. In accordance with one such form, a vent 90 is provided with an upper release valve 92. This valve is such that air can ingress into the underdrain 40 to maintain a volume of air above the filtered effluent which does not completely fill the underdrain 40 during normal filtering operation of unit A. Air in the underdrain is utilized in practicing the present invention in this preferred embodiment.

In accordance with the invention, periodically, fluid, such as air, is entrapped within underdrain 40 and forced upwardly through the sand filter 30 for a short period of time. This loosens and lifts crust formed adjacent to and as a part of surface 31 and prolongs the filtering operation of unit A. In accordance with the illustrated embodiment of the invention, the air within underdrain 40 is compressed by a hydraulic or liquid ram created by energizing pump 54. To create this liquid ram, valve 50 is closed and valve 52 is opened, thus entrapping air in the underdrain. Liquid is forced into the underdrain which, in turn, forces air within the underdrain upwardly through the sand filter 30. After this air has been forced upwardly through the sand filter, the pump 54 is deenergized, valve 50 is opened and valve 52 is closed for normal operation of the filter unit A.

Figure 2A:
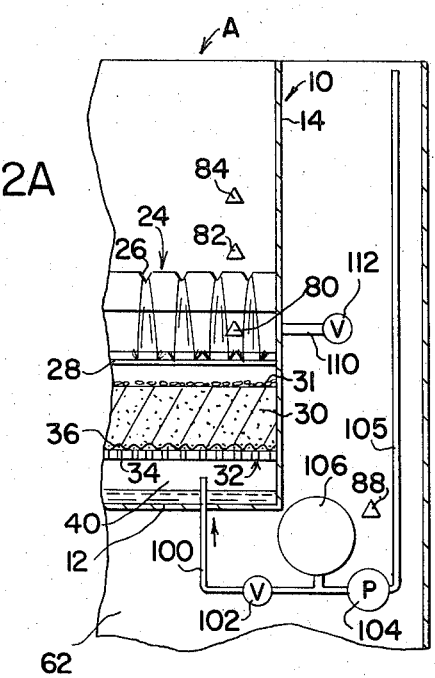
FIG. 2A is a partial cross-sectional view showing a modification of the embodiment illustrated in FIGS. 1 and 2.

In accordance with a modification of the present invention, as shown in FIG. 2A, there is provided a pressurized source of air communicated with the underdrain 40. A variety of structures could be used for this purpose; however, in accordance with the illustrated embodiment of the present invention, there is provided an air inlet conduit 100 communicated with the underdrain 40. A valve 102 is provided in the conduit for selectively directing pressurized air into the underdrain. A pump 104 having an inlet 105 communicated with atmosphere, provides the pressurized air. In accordance with the illustrated embodiment, an accumulator 106 is employed between the pump and the valve to store a sufficient volume of pressurized air for use in forcing the air upwardly through the sand filter.

To provide normal backwashing of the filter unit A, there is included a backwash conduit 110 communicated with the trough 24 and including a selectively energized valve 112. When the valve is open and fluid is forced over the sides of trough 24, the fluid is discharged through the conduit 110 into the mud well 62.

Figure 3:
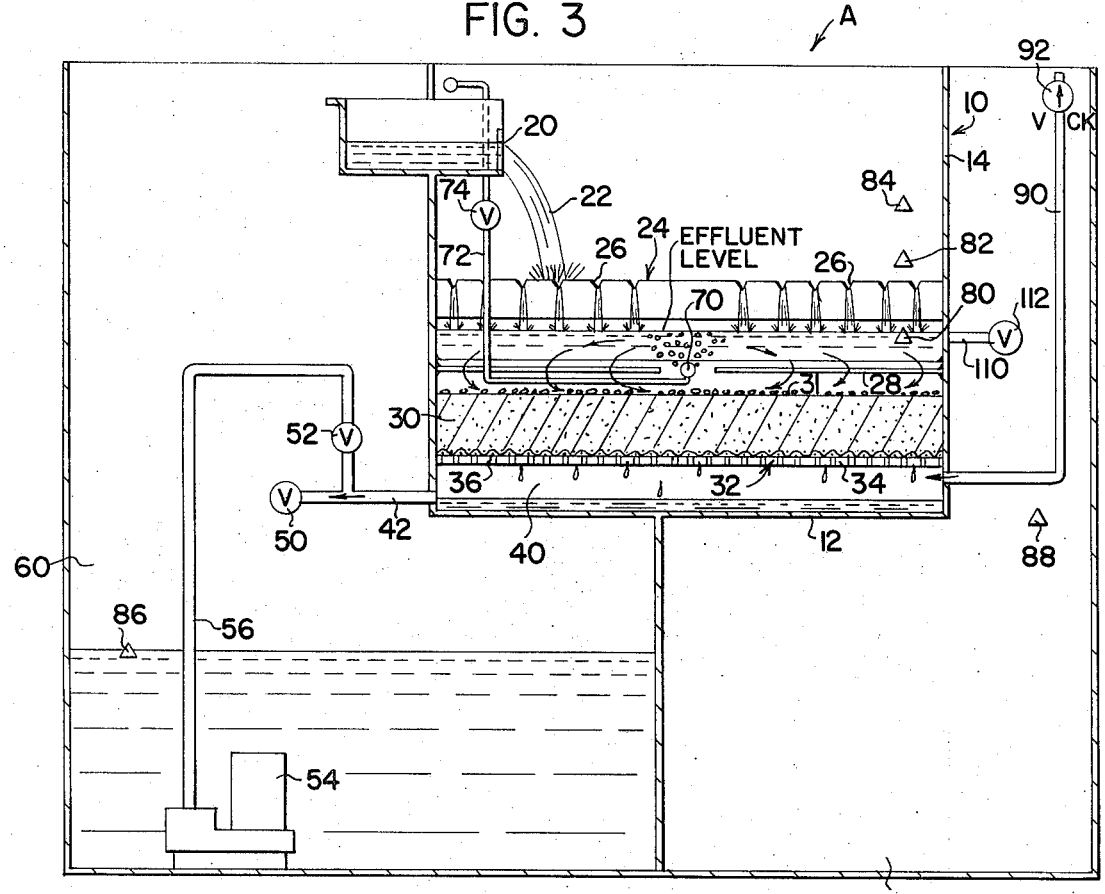
FIG. 3 is a cross-sectional, side view similar to FIG. 1 showing an operating condition of the invention.

Referring now to the operation of the preferred embodiment of the invention as illustrated in FIGS. 1 and 2, reference is made to FIG. 3. Partial blocking of surface 31 by floc particles lying on the surface and by fine suspended particles within the upper portion of the sand filter 30 causes the water level above the sand filter to increase. As the level increases over probe 80, as shown in FIG. 3, valve 74 is opened to allow air to be discharged through line 72 and into diffuser 70. This creates a velocity over the surface 31 of the filter 30 lifting the floc particles off the surface and permitting an increased filtration time. The small particles within the interstices of the sand filter, however, are trapped within the upper layer of the sand filter and, in time, additional small particles of floc are also trapped within the sand media causing the effluent level to raise further above the sand filter 30 until the level reaches the probe, or level sensor 82. This is illustrated in FIG. 4. In accordance with the preferred embodiment of the invention, the sensor, or probe 82 then energizes the filter pulsing system in accordance with the present invention by closing outlet valve 50 and opening inlet valve 52 so that the underdrain is communicated with the outlet side of pump 54. Pump 54 is selected to discharge a quantity of liquid in the range of 12–15 gallons per minute per square foot of media surface. This represents a displacement volume of about 1.6 to 2.0 cubic feet per square foot of surface area. The pump liquid is discharged from the pump through conduit 56 into the underdrain 40. The liquid from the pump starts to fill the underdrain, which compresses the air trapped in the underdrain and above the liquid level. As air is compressed within the underdrain, a resultant air pressure is developed as a function of a resistance to the media 30 over the compressed air within the underdrain. The air within the underdrain is then forced upwardly through the interstices of the sand filter 30 and is retarded by the clogging effect of particles trapped within the interstices of the filter media generally at or near the upper surface 31. The air pressure generated is not greater than necessary to dislodge the particles and clear the passageways between the various particles within the sand filter.

In some cases, these particles will enter the interstices and adhere directly onto the particulate material comprising the sand filter. In this case, a crust is also formed adjacent the upper surface of the sand filter. It has been found that the pressurized air passing through the filter will dislodge a chunk of crust of such composition generally about 1/8–3/16 inches thick. Such crust particles are then entrapped in the current velocity created over the surface 31 by the diffuser 70. In this manner, passages through the sand filter are cleared and filtering action may continue. After a predetermined time, the compressed air being forced through the sand filter by the water piston action created by pumping water into the underdrain 40 is terminated by deenergizing the pump 54. At this time, valve 50 is opened and all remaining air pressure within the underdrain 40 is exhausted. Also, the water within the underdrain which was used to force the air upwardly is also expelled from the underdrain to the clear well 60. This cleaning action removes particles from the interstices of the sand filter to permit increased filtering time. It has been noted, that the present invention is accompanied by a drop in the liquid level over the filter surface. The pulsing cycle is repeated when the effluent above the surface 31 again rises to level sensor 82.

Ultimately, the filter must be backwashed to remove loaded liquid effluent above the sand filter 30 and also flush out particles within the filter 30 itself. This may be done at a selected time, or it may be done in response to a preselected increase in the liquid effluent level above the sand filter 30. The latter approach is used in the preferred embodiment of the invention. When the level of the effluent above the sand filter increases to the probe 84, the valve 50 is closed, valve 52 is opened and valve 112 is opened. Then the pump 54 is energized, pumping liquid from the clear well 60, through filter 30, trough 24, conduit 110, and valve 112 and into the mud well 62. This backwashing operation takes place for a prolonged period of time, generally from 3–5 minutes, to provide substantial cleansing of the sand media. Backwashing takes place at a relatively high rate, i.e., about 3–4 times the normal filtering rate. Probe 86 indicates that there is sufficient liquid within the clear well 60 for backwashing. Also, probe 88 indicates that there is sufficient capacity in the mud well 62 for receiving the backwash fluid. After the backwash has been accomplished, effluent from the mud well can be pumped back into the secondary sewage treatment system for reprocessing at a desired rate to prevent hydraulic loading.

The pulsing of the pump 54 for compressing air and moving it upwardly through the sand filter takes place between backwashing cycles of the sand filter. Only a sufficient amount of liquid to compress the air within the underdrain is used. It is possible to force water upwardly through the sand filter to cause dislodging of particles adjacent the upper surface of the sand filter between backwashing operations; however, the use of water for this purpose presents the possibility of disarranging the filter media by folding solids into the media which should be avoided.

It is also possible to avoid the use of valves 50 and 52 by having the conduit 56 connected directly to outlet 42. Thus, during filtering, the filtrate flow from conduit 42, through conduit 56 and then through pump 54 into the clear well 60. This arrangement will not require the upwardly extending looped portion of conduit 56, and conduit 56 will extend downwardly from the conduit 42 directly to the pump 54. Energizing of the pump 54 automatically compresses the air within chamber 40. In this arrangement, the vacuum release device shown in FIG. 1, or an equivalent thereto, must be provided to assure air in the underdrain. Energizing the pump can also backwash the filter subsequent to the pulsing operations, in accordance with the present invention. This type of arrangement is shown in FIG. 12 of U.S. Pat. No. 3,459,302 and requires no valve operation, pulsing or backwash.

Figure 5:
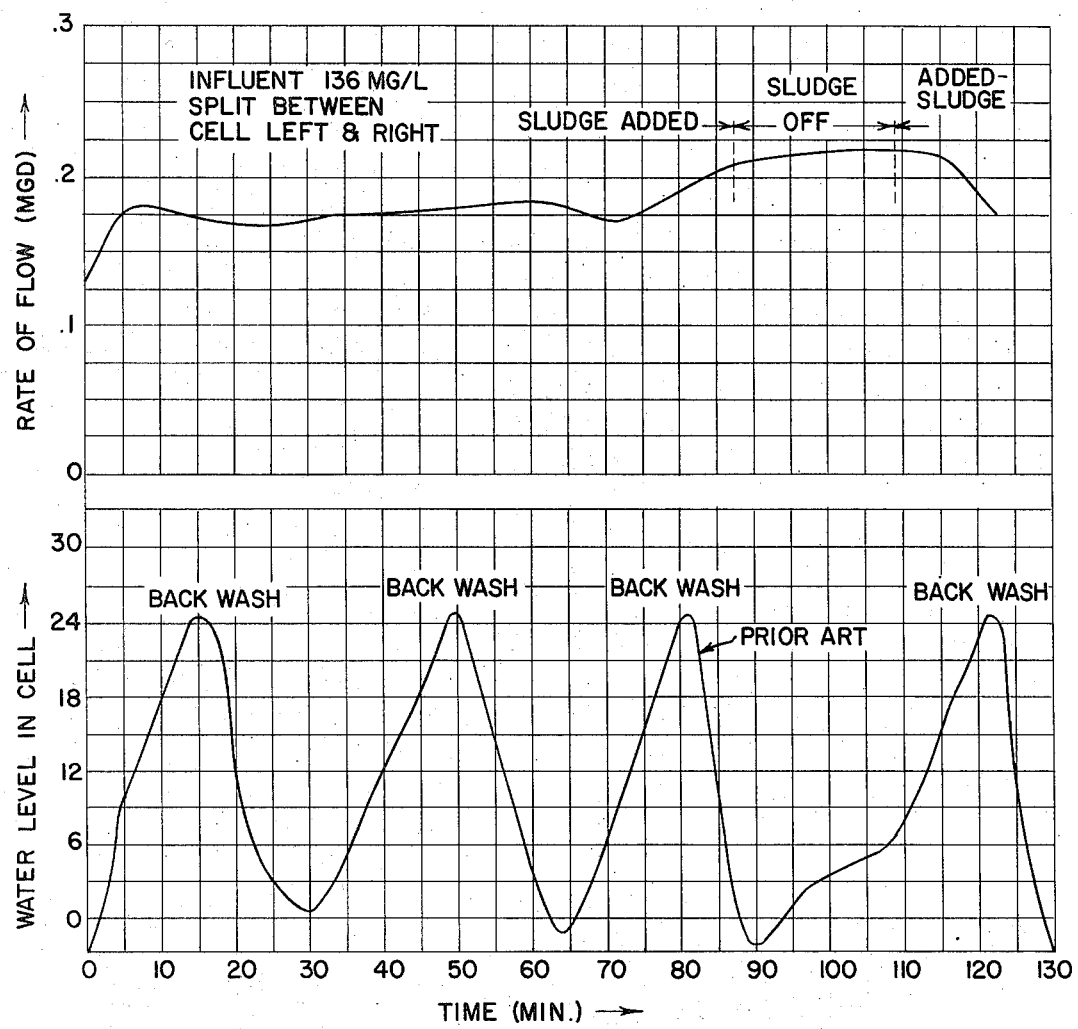
FIG. 5 is a chart illustrating the operation of a sand filter of the type to which the present invention is particularly adapted and without use of the present invention.

Referring now to FIG. 5, the upper portion of the chart illustrates the rate of flow of an effluent including 136 milligrams of solids per liter of effluent introduced into filter unit A. The lower part of the graph illustrates the effluent level above the sand filter when the probe 82 is deactivated and no pulsing of air through the sand filter is accomplished. It is noted that within about two hours the filter, without the present invention, required backwashing four times.

Figure 6:
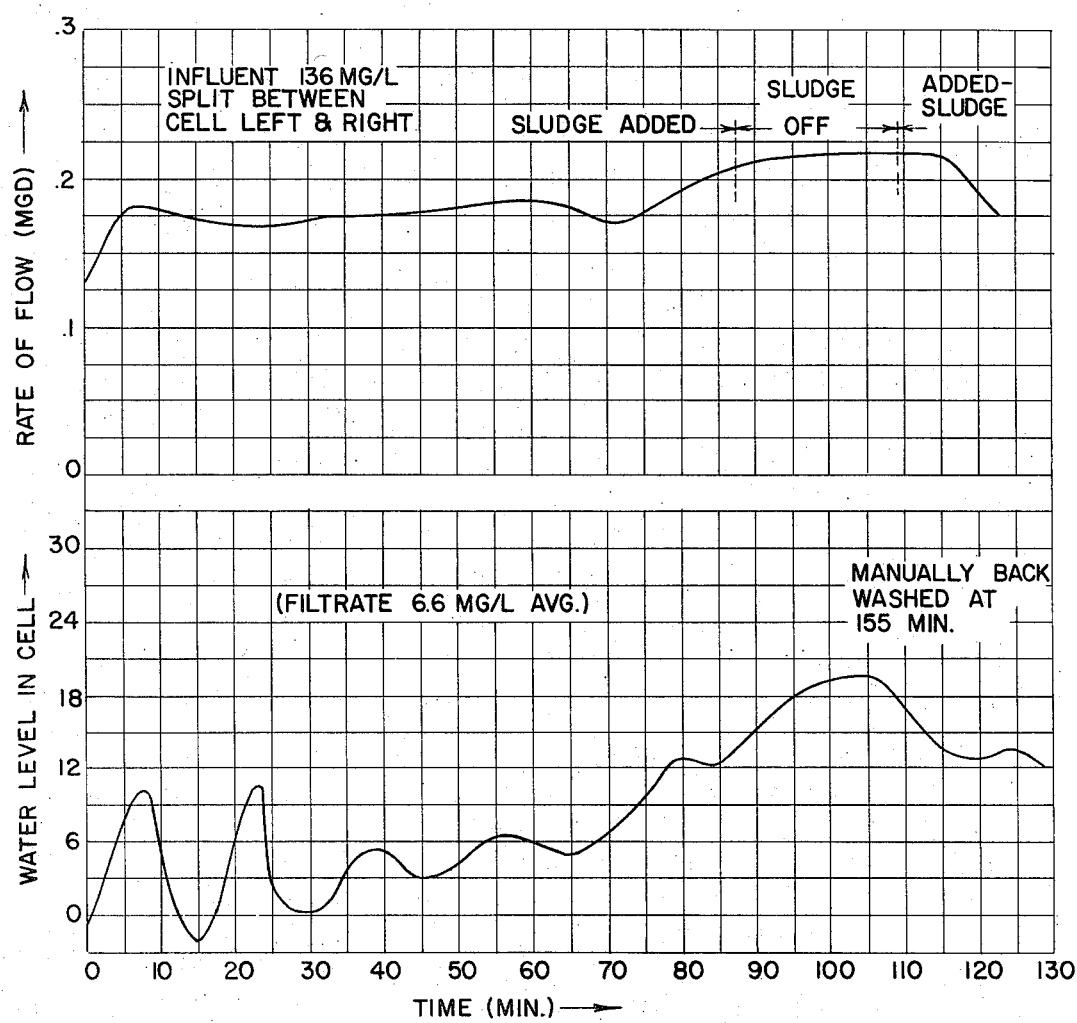
FIG. 6 is a chart similar to FIG. 5 illustrating a sand filter utilizing the present invention.

Referring now to FIG. 6, the same effluent as in the chart of FIG. 5 was introduced into a filter utilizing the probe 82 and the present invention wherein fluid is pumped through the sand filter in a reversed direction during the filtering operation. It is noted that in FIG. 6, the effluent level above the sand filter did not increase to a point requiring backwashing during the two hour period during which four backwashing cycles were required in the prior art type of tertiary sand filter. This clearly shows the advantage of pulsing fluid, such as air, through the sand filter in a reverse direction during the actual filtering operation of filter unit A. The peaks in the chart shown in the lower half of FIG. 6 represent the times when the air pulsing of the sand filter was accomplished. It is noted that the level above the sand filter decreased drastically after the initial pulses. As pulses continued, there was a less drastic reduction in the level of the water above the sand filter. This is caused by the blocking of the sand filter to a higher level because of increased total filtration time.

Various modifications may be made in the control system for the present invention. For instance, the operator of the filter may establish the number of pulses. Tests have proven that while the filtering cell or unit will not backwash frequently when applying the present invention, a substantial number of pulses will cause the filter media to be packed to a deeper level which can make backwashing difficult. Consequently, a certain number of pulses may be designed into the control system to prevent this difficulty. After the designed number of pulses, the filter is permitted to plug normally so that the liquid level rises to the prove 84 which initiates the backwash cycle.

Another arrangement for controlling the preferred embodiment of the invention is the use of an adjustable timing device which records the time for the liquid to rise from probe 80 to probe 82. If the water level reaches probe 82 before the preselected time of the timer has expired indicating a rapidly plugging filter, the pulsing arrangement for forcing air through the filter in the reverse direction is energized and a light or other indicator is given. This indicates that the liquid level has raised to the probe 82 at an unusually high rate. Such an indication alerts the operator to the fact that a poor quality effluent is being introduced into the sand filter. This may mean that the secondary plant before the sand filter has been upset. The operator can then inspect the effluent and take corrective measures. An experienced operator need only be advised of the fact that a poor quality liquid is being introduced into the sand filter to take the corrective measures with the secondary plant or filtering operation.

The frequency, intensity and number of pulses for the pulsing of air through the sand filter may be varied and adjusted in accordance with the type and design of media being used and the quality of effluent normally received by the filter. Still further modifications of this system can provide a backwash at a specific time. For example, assume that the hydraulics of the secondary treatment system are near the point of maximum amplitude during a major portion of the operating day, a simple timing device can be inserted into the circuit for controlling the backwash and pulsing of the filter so that the backwashing takes place at a precise time when the hydraulic load in the secondary system is generally at a minimum.

Figure 7:
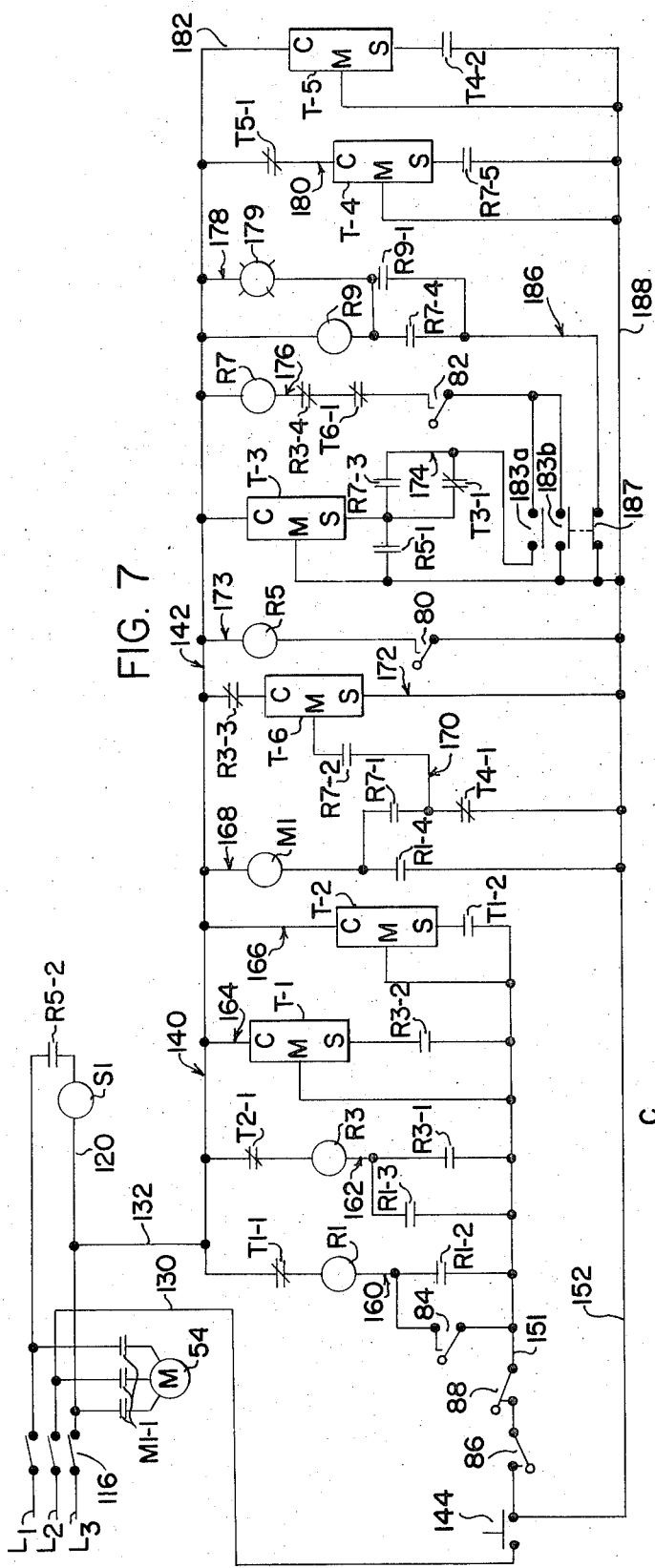
FIG. 7 is a schematic wiring diagram of one embodiment of a control system usable in practicing the present invention.

A variety of control circuits could be used for controlling the pulsing of the filter between backwashing and the actual backwashing of the filter, as explained in connection with the preferred embodiment of the invention. For the purpose of explanation, a simplified control system is illustrated in FIG. 7 which is appropriate for use in an embodiment wherein valves 50, 52 and 112 are not employed. In such a unit, the trough 24 is above sensor 84 and is used only during actual backwashing. This simplified design is sufficient to explain one type circuit for controlling backwash and pulsing. The same circuit could be adapted for use with a unit employing valves 50, 52 and 112 with minor modifications. Referring now to FIG. 7, three phase input lines $L_1$, $L_2$ and $L_3$ are connected onto the circuit by connectors 116. This closes a circuit 120 including relay S1 and normally open contact R5–2. Relay S1 is used for opening valve 74 for causing air flow through the diffuser 70. Lines 130, 132 are connected onto two separate control circuits 140, 142. Control circuit 140 is used for backwashing and control circuit 142 is used for the pulsing operation. These two circuits are controlled by a master switch 144 for controlling input lines 151, 152. Referring now to the backwash control circuit 140, it includes a branch 160 having normally open contact R1–2, probe contact 84, relay R1 and normally closed contact T1–1. Branch 162 includes normally open contact R3–1, normally open contact R1–3, relay R3 and normally closed contact T2–1. Electrical branch 164 employs a timer T1 and a normally open contact R3–2. The last branch 166 includes a timer T2 and a normally open contact T1–2. The contacts for this circuit and the remaining circuit correspond to the respective timer or relays and are energized in accordance with the operation of these timers and relays to change their normal conditions. The next branch illustrated in FIG. 7 is branch 168 including relay M1 for controlling the contacts M1–1 of pump 54. Also in this branch is a normally open contact R1–4.

Operation of the backwash cycle is evident from the wiring diagram. When sufficient liquid is in the clear well 60, probe 86 is closed. If the mud well has sufficient remaining capacity to receive backwash effluent, the probe 88 is closed. In this condition, the closing of probe 84 energizes relay R1 in branch 160. This closes relay R1–3 to energize relay R3 and closes contact R1–4 to energize relay M1 to start the backwash pump 54. Relay R3, in turn, closes contact R3–1 to hold in the relay R3. In addition, contact R3–2 is closed starting the timing cycle of timer T1. The contacts of T1 remain in their normal condition until T1 times out. When T1 times out, contact T1–1 is open deenergizing relay R1 which opens contact R1–4 in branch 168 to stop the pump 54. Contact T1–2 is closed when T1 times out. This starts the timing cycle of timer T2. When the timer T2 times out contact T2–1 is open deenergizing the relay R3. The purpose of timer T2 is to allow the level within the filter to decrease below probes 82, 84 before these probes can again initiate any action. After sufficient time has elapsed for this purpose, timer T2 times out opening normally closed contact T2–1 which deenergizes relay R3 which opens contacts R3–1 and T2–2 for again setting the timer T1 for subsequent operation.

Referring now to control circuit 142, it includes a branch 170 between branch 168 and a branch 172. Branch 170 includes normally open contacts R7–2 and is connected to branch 168 between normally open contact R7–1 and normally closed contact T4–1. Branch 172 includes a normally closed contact R3–3 and the timer T6. Branch 173 includes a relay R5 and the air diffuser probe 80. Complex branch 174 includes timer T3, normally open contacts R5–1, and R7–3, and normally closed contacts T3–1. Branch 176 includes relay R7, normally closed contacts R3–4 and T6–1 and the pulsing probe 82. Branch 178 includes a relay R9, a light 179 and normally open contacts R7–4 and R9–1. Branch 180 includes normally closed contact T5–1, timer T4 and normally open contact R7–5. Branch 182 includes timer T5 and normally open contacts T4–2. Switch 183a is provided between branches 174 and 176. Another switch 183b is connected between line 152 and branch 176. Line 186 includes a switch 187 and is connected between line 152 and branch 178. Line 188 connects the branches 180, 182 with the common line 152. Switches 183a, 183b and 187 have a particular mode of operation. Switches 183b and 187 are interconnected so that the normal open switch 183b is opened when the normally closed switch 187 is closed and vice versa. Switches 183a and 183b are controlled in a manner which allows only one switch to be closed.

In operation, it is appreciated that the respective contacts are shown in their normal position and they are operatively positioned when their respective timers have timed out and when the respective relays have been energized. It is noted that branches 172 and 176 are open when relay R3 is energized. This prevents circuit 142 from operating during the backwashing cycle of the filter. The opening of contacts R3-3 resets timer T6 which is a timer for measuring the total length of pulses during a succession of pulses of air through the filter media. When probe 80 is closed, relay R5 is energized. This closes contacts R5-2 for energizing the air diffuser through relay S1. This also closes contact R5-1 which operates the solenoid of timer T3 and starts the timing cycle of timer T3. Timer T3 is used only when the switch 183a is closed and 186 is closed. This arrangement is used to measure any rapid rise in the head or liquid level above the filter media. This operation will now be described.

As long as timer T3 is not timed out, the normally closed contact T3-1 is in the closed condition. If the liquid level reaches probe 82 before contacts T3-1 open, the relay R7 is energized and closes contact R7-3 to create a circuit through switch 183a. This starts the pulsing cycle. If the timer T3 times out and opens contact T3-1 before probe 82 closes, subsequent closing of probe 82 will not cause pulsing of the filter A. Assume the first condition, when R7 is energized, this closes contacts R7-4 which energizes relay R9. This closes contact R9-1 and lights the light 179. At the same time, contact R7-5 is closed which starts timer T4. This times the duration of the pulse and operation of the pump 54. The relay R7 also closes contact R7-1 for energizing the relay M1 to start the motor 54. When timer T4 times out, this opens contact T4-1 and turns the motor off. At the same time, this closes contact T4-2 and energizes timer T5. This timer times the cycle between pulses. When timer T5 has timed out, contact T5-1 is open which resets the pulse timer T4. This immediately opens contact T4-2 and resets timer T5 for subsequent measuring of spacing between the pulses. Resetting the timer T4 immediately shifts contact T4-1 to the normally closed condition and again actuates the motor 54 to again pulse the air through the filter. Now, the pulse timer T4 and the spacing or cycle timer T5 alternate in operation to pulse the filter repeatedly for selected times with selected time gaps therebetween until the liquid level reached probe 84. At that time, backwashing overrides the pulsing operation and resets the pulse circuit for a high rising head type of operation, which has been described.

If the number of pulses of the filter reaches a certain level without the filter having backwashed, the accumulation timer T6 then times out. When it is energized and contacts T4-1 are closed motor 54 is operating to pulse the filter and the time of the pulse is accumulated on timer T6. After so many pulses, T6 times out which opens contacts T6-1 and deenergizes the relay R7. No more pulses can take place until relay R3 has been energized during backwash which opens contact R3-3 and resets timer T6.

If the rising head type of approach is not to be used, switch 183b is closed and this opens switch 187. This bypasses timer T3 and deenergizes branch 176. In this instance, the probe 82 controls the pulsing cycle, irrespective of the time which is required for the effluent to reach the level of this probe.

Figure 8:
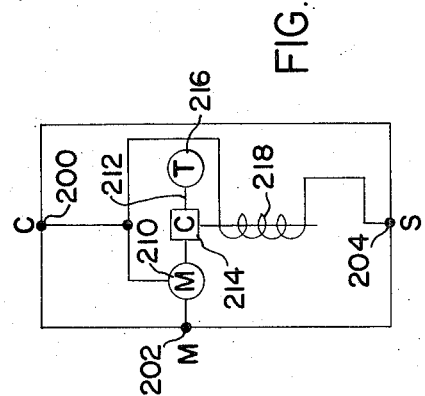
FIG. 8 is a schematic wiring diagram of one component illustrated in FIG. 7.

Referring now to FIG. 8, there is illustrated a diagram of the timers shown in FIG. 7. These timers include terminals 200, 202, and 204. Within the timer there is a motor 210 having a shaft 212 and a clutch 214 selectively connecting the motor shaft to the timer contact operator 216. The relay or solenoid 218 closes the clutch upon energization. This type of timer can be operated in two separate modes. One mode is with the motor terminal 202 connected to a power source. In this manner, the motor is operating at all times. When the solenoid terminal 204 is connected to a voltage source, clutch 214 is operated for timing out a certain selected time to operate switches after the selected time. Timers T1, T2, T3, T4 and T5 are operated in this manner. The motor is running constantly during energization and the solenoid is actuated to selectively time out a given time period. By connecting the solenoid terminal 204 continuously to a power source, clutch 214 is continuously energized. This connects the motor 210 with the operator 216. In this manner, by repeatedly energizing the motor 210 through terminal 202 there is an accumulation mode of operation. The timer is not reset each time the motor is deenergized. In this manner, time can be accumulated on the timer. This approach is utilized for timer T6 in FIG. 7.

The time that the motor 54 is energized for pulsing the filter is a function of the cavity volume and the pump displacement. For instance, if the underdrain 40 is 8 inches deep there is 0.75 cubic feet for each square foot of sand filter. Pump 54 generally discharges 12–16 gallons per minute per square foot of sand filter. Thus, there is about 1½ cubic feet per minute of pump displacement. If the underdrain is dry, this means that the underdrain can be completely filled by liquid from 8/18 × 60 seconds or approximately 26 seconds. However, the underdrain is generally filled with up to one-third to one-half water. Consequently, the pump is generally operated between 11 and 13 seconds to expel that volume of air displaced by this amount of liquid being forced into the underdrain. Of course, other modifications could be made in the ratio of pump discharge to volume of air in the underdrain. Also, the amount of air forced through the filter may be less than the air within the underdrain. If the pump is energized too long, liquid is forced through the filter and may cause some disarrangement of the media. This, in the preferred embodiment, is avoided to the extent possible although liquid may be used in some instances to pulse the filter in accordance with the broader aspects of this invention.

Having thus defined my invention, I claim:

1. A method of operating a filter including a tank having a filter bed of particulate matter therein, said filter bed having an upper surface and an underdrain cavity therebelow, said method comprising the steps of:

a. filtering a waste effluent through said filter bed in a first direction;
   b. measuring the time required for the liquid level above said upper surface to reach a preselected level;

c. comparing said measured time to a preselected reference time;
d. creating a signal when said measured time is less than said reference time;
e. forcing gas through said filter in a second direction different from said first direction when said signal is created to dislodge particles from said filter bed; and, thereafter,
f. continuing filtering said waste effluent through said filter bed in said first direction.

2. The method as defined in claim 1 including the additional step of:
g. creating currents in a body of effluent above said surface for holding at least some of said dislodged particles in suspension.

3. The method as defined in claim 2 wherein said current creating step includes creating air bubbles in said body of effluent above said upper surface.

4. A method of operating a filter including a tank having a filter bed of particulate matter therein, said filter bed having an upper surface, said method comprising the steps of:
a. filtering a waste effluent through said sand filter in a first direction;
b. forcing gas through said filter bed in a second direction opposite to said first direction for a controlled time to dislodge particles from said filter;
c. repeating said forcing step for a number of times;
d. then, allowing the liquid level above said surface to rise;
e. determining when said liquid level reaches a preselected level;
f. then, forcing liquid through said filter in said second direction for a time substantially greater than said controlled time; and,
g. removing liquid from said tank and above said filter surface.

5. The method as defined in claim 4 including the additional step of:
h. creating currents in a body of effluent above said surface for holding at least some of said dislodged particles in suspension.

6. The method as defined in claim 5 wherein said current creating step includes creating air bubbles in said body of effluent above said upper surface.

7. A method of operating a filter including a filter bed of particulate material therein, said filter bed having an upper surface, an upper backwashing outlet and an underdrain cavity therebelow, said method comprising the steps of:
a. introducing a waste effluent above said filter bed upper surface;
b. allowing said effluent to filter through said filter bed into said underdrain cavity;
c. discharging said filtered effluent from said underdrain cavity;
d. allowing a volume of gas to accumulate in said underdrain cavity during said filtering step;
e. after a body of liquid has been developed over said surface, entrapping said gas in said underdrain cavity;
f. forcing a liquid into said underdrain cavity to compress said entrapped gas in said cavity;
g. continuing said forcing step until at least a part of said gas has been forced from said underdrain cavity upwardly through said filter bed and into said body of liquid above said surface to dislodge particles from said filter bed;
h. discontinuing said forcing step before a portion of liquid from said underdrain is discharged through said backwashing outlet;
i. continuing filtering said effluent through said filter bed into said underdrain cavity; and,
k. again allowing a volume of gas to accumulate in said underdrain cavity during said continuing filtering.

8. A method as defined in claim 7 including the additional step of;
j. creating currents in said body of effluent above said surface for holding in suspension at least some of the particles dislodged from said filter bed.

9. The method as defined in claim 8 wherein said current creating step includes creating air bubbles in said body of effluent above said upper surface.

10. A method of operating a filter including a tank having a filter bed of particulate matter therein, said filter having an upper surface, an upper backwashing outlet and an underdrain cavity therebelow, said method comprising the steps of:
a. introducing a waste effluent above said filter bed upper surface;
b. allowing said effluent to filter through said filter bed into said underdrain cavity;
c. discharging said filtered effluent from said underdrain cavity;
d. allowing a volume of gas to accumulate in said underdrain cavity during said filtering step;
e. after a body of liquid has been developed over said surface, entrapping said gas in said underdrain cavity;
f. forcing a liquid into said underdrain cavity to compress said entrapped gas in said cavity;
g. continuing said forcing step until at least a part of said gas has been forced from said underdrain cavity upwardly through said filter and into said body of liquid above said surface to dislodge particles from said filter bed;
h. discontinuing said forcing step before liquid is forced from said underdrain cavity, through said filter bed and into said body of liquid above said filter bed; and,
i. continuing filtering said effluent through said filter bed into said underdrain cavity.

11. A method as defined in claim 10 including the additional step of:
j. creating currents in said body of effluent above said surface for holding in suspension at least some of the particles dislodged from said filter bed.

12. The method as defined in claim 11 wherein said current creating step includes creating air bubbles in said body of effluent above said upper surface.

13. A method of operating a filter including a tank having a filter bed of particulate matter therein, said filter bed having an upper surface and an underdrain cavity therebelow, said method comprising the steps of:

a. filtering a waste effluent through said filter bed in a first direction;
b. causing air to flow into said underdrain cavity;
c. hydraulically pressurizing said underdrain cavity to force air therefrom through said filter bed in a second direction opposite to said first direction to dislodge particles from said filter bed;

d. releasing the pressure in said underdrain;

e. causing air to flow into said underdrain cavity;

f. repeating the step of pressurizing said underdrain;

g. then, repeating said releasing step;

h. later, forcing liquid through said filter in said second direction for backwashing said filter.

14. A method as defined in claim 13 including the additional step of:

i. creating currents in said body of effluent above said surface for holding in suspension at least some of the particles dislodged from said filter bed.

15. A method as defined in claim 14 wherein said current creating step includes creating air bubbles in said body of effluent above said upper surface.

16. A method of operating a filter for a single filter run, said filter including a filter bed of particulate matter, said filter bed having an upper surface, and an underdrain cavity below said filter bed, said method comprising the steps of:

a. initially filtering a waste effluent through said filter bed in a first direction;

b. causing air to accumulate in said underdrain cavity;

c. after a body of effluent has developed above said surface, forcing said accumulated air upwardly from said underdrain, through said filter bed in a second direction generally opposite to said first direction and into said body of effluent to dislodge particles from said filter bed;

d. independently creating currents in said body of effluent above said surface for holding in suspension at least some of said dislodged particles;

e. after said forcing step, continuing filtering said waste effluent through said filter bed in said first direction and during said single filter run; and, f. again allowing air to accumulate in said underdrain cavity during said single filter run.

17. A method of operating during a single filter run a filter including a tank having a filter bed of particulate matter therein, said filter bed having an upper surface, and an underdrain cavity therebelow for receiving filtered effluent, and a backwash outlet in said tank and above said surface, said method comprising the steps of:

a. filtering a waste effluent through said filter bed in a first direction;

b. causing air to flow into said underdrain cavity and above liquid in said underdrain;

c. pressurizing said air in said underdrain cavity by action of air against liquid therein to force said air from said underdrain, through said filter bed in a second direction opposite to said first direction to dislodge particles from said filter bed;

d. discontinuing said pressurizing step before filtered effluent is forced through said filter bed, into said tank and to said backwash outlet;

e. continuing filtering said waste effluent in said first direction; and, f. then, terminating said filter run by backwashing said filter bed.

18. A method as defined in claim 17 including the additional step of:

g. creating currents in said body of effluent above said surface for holding in suspension at least some of the particles dislodged from said filter bed.

19. A method as defined in claim 18 wherein said current creating step includes creating air bubbles in said body of effluent above said upper surface.

20. A method of operating a filter for a single filter run, said filter including a filter bed of particulate matter, said filter bed having an upper surface, a backwash outlet above said surface, and an underdrain chamber generally below said filter bed, said method comprising the steps of:

a. initially filtering a waste effluent through said filter bed into said chamber in a first direction;

b. after a body of effluent has developed above said filter bed, forcing gas from said chamber upwardly through said filter bed in a second direction generally opposite to said first direction;

c. discontinuing said forcing step before filtered effluent is forced through said filter bed, into said body of effluent and to said backwash outlet;

d. continuing filtering said waste effluent through said filter bed in said first direction; and, e. then, terminating said filter run by backwashing said filter bed including the step of forcing at least some liquid upwardly through said filter bed in said second direction.

21. The method as defined in claim 20 wherein said gas forcing step dislodges particles from said filter bed and including the additional step of:

f. creating currents in a body of effluent above said surface for holding at least some of said dislodged particles in suspension.

22. The method as defined in claim 21 wherein said current creating step includes creating air bubbles in said body of effluent above said upper surface.

23. A method of operating a filter for a single filter run, said filter including a filter bed of particulate matter, said filter bed having an upper surface, and an underdrain chamber generally below said filter bed, said method comprising the steps of:

a. initially filtering a waste effluent through said filter bed into said chamber in a first direction;

b. forcing gas from said chamber upwardly through said filter bed in a second direction generally opposite to said first direction;

c. discontinuing said forcing step;

d. continuing filtering said waste effluent through said filter bed in said first direction;

e. then, terminating said filter run by backwashing said filter bed including the step of forcing at least some liquid upwardly through said filter bed in said second direction; and, f. repeating said gas forcing step, discontinuing step and continuing filtering step prior to said terminating step.

24. In a waste effluent filter of the type including a filter tank, a layer of particulate matter in said tank and forming a filter element having an upper surface, means forming an underdrain cavity generally below said filter element, an effluent inlet above said surface, means forming a filtered effluent drain connected to said underdrain cavity for draining filtered effluent from said underdrain cavity, a pumping means connected to said underdrain cavity for pumping liquid into said underdrain cavity and upwardly through said filter element, control means for energizing said pumping means for a selected duration at controlled backwash times, means for providing a backwash outlet in said tank above said upper surface and means for directing fluid through said backwash outlet during each of said backwash times; means communicated with said underdrain cavity for introducing gas into said underdrain cavity; and actuatable means associated with said filtered effluent drain and having a first condition preventing flow of filtered effluent from said drain and a second condition allowing flow of filtered effluent from said drain, the improvement comprising: level sensing means secured within said tank and at a selected position above said surface for sensing when the effluent above said surface is at a given level, said level sensing means having a first condition when said level of effluent is below said given level and a second condition when said level of effluent is at least as high as said given level; first electrical control means responsive to said second condition of said level sensing means for shifting said actuatable means into its first condition; means for forcing said gas from said underdrain cavity upwardly through said filter element and into said tank whereby particles adjacent said surface are dislodged by said gas and carried into said body of effluent; second electrical control means for energizing said forcing means in response to said second condition of said level sensing means; a timer including an actuation means and means for creating a signal when the timer has been actuated a set time substantially less than said selected duration; third electrical control means responsive to said second condition of said level sensing means for actuating said timer; fourth electrical control means for deenergizing said forcing means upon creation of said signal; and fifth electrical control means responsive to creation of said signal for shifting said actuatable means into its second condition.

25. The improvement as defined in claim 24 wherein said forcing means is said pumping means, said second electrical control means includes means for energizing said pumping means and said fourth electrical control means includes means for deenergizing said pumping means.

26. The improvement as defined in claim 24 including means adjacent said upper surface for creating currents within a body of effluent above said surface whereby particles dislodged by said forcing means tend to stay in suspension.

27. The improvement as defined in claim 26 wherein said current creating means includes means for introducing air bubbles into said effluent above said upper surface.

28. The improvement as defined in claim 27 wherein said bubble introducing means is a diffuser adjacent said upper surface.

29. In a waste effluent filter of the type including a filter tank, a layer of particulate matter in said tank and forming a filter element having an upper surface, an underdrain cavity generally below said filter element, an effluent inlet above said surface, a filtered effluent outlet connected to said underdrain cavity, a pumping means for pumping liquid into said underdrain cavity and upwardly through said filter element, control means for energizing said pumping means for a selected duration at controlled backwash times, means for providing a backwash outlet in said tank above said upper surface and means for directing fluid through said backwash outlet during each of said backwash times and means for entrapping a volume of gas within said underdrain cavity, the improvement comprising: means for forcing liquid into said underdrain cavity, a first control means for starting said forcing means, a second control means for stopping said forcing means; third control means for energizing said first control means at preselected times; means for indicating when said third control means is actuated; timer means for energizing said second control means a set time after said indicating means indicates actuation of said third control means; and fourth control means for preventing operation of said third control means during said backwash times.

30. The improvement as defined in claim 29 including means adjacent said upper surface for creating currents within a body of effluent above said surface whereby particles dislodged by said forcing means tend to stay in suspension.

31. The improvement as defined in claim 30 wherein said current creating means includes means for introducing air bubbles into said effluent above said upper surface.

32. The improvement as defined in claim 31 wherein said bubble introducing means is a diffuser adjacent said upper surface.

33. In a waste effluent filter comprising a filter tank, a layer of particulate material in said tank and forming a filter element having an upper surface, means forming an underdrain cavity generally below said filter element, an effluent inlet above said surface, a filtered effluent outlet connected to said underdrain cavity, a pumping means for pumping liquid into said underdrain cavity and upwardly through said filter element, a first level sensing means for sensing when liquid above said surface is at a given level, and means responsive to said first level sensing means for energizing said pumping means when the liquid level reaches said given level to thereby backwash said filter element, the improvement comprising: means for forcing gas from said underdrain cavity through said filter element, means for energizing said forcing means; means for deenergizing said forcing means; a second level sensing means located in said tank and including means for creating an electrical signal when said body of effluent has reached a given level below said selected level; means responsive to said electric signal for actuating said energizing means, and timing means for actuating said deenergizing means after a preselected time.

34. The improvement as defined in claim 33 including means adjacent said upper surface for creating currents within a body of effluent above said surface whereby particles dislodged by said forcing means tend to stay in suspension.

35. The improvement as defined in claim 34 wherein said current creating means includes means for introducing air bubbles into said effluent above said upper surface.

36. The improvement as defined in claim 35 wherein said bubble introducing means is a diffuser adjacent said upper surface.

37. A method of operating a filter including a tank having a filter bed of particulate matter therein, said filter bed having an upper surface, an upper backwashing outlet and an underdrain cavity generally below said filter bed, with a filtered effluent outlet communicated with said underdrain cavity, said method comprising the steps of:

a. introducing a waste effluent above said filter bed upper surface;

b. allowing said effluent to filter through said filter bed into said underdrain cavity;
c. discharging said filtered effluent from said underdrain cavity and through said filtered effluent outlet;
d. closing said filtered effluent outlet;
e. forcing a gas into said underdrain cavity under pressure whereby said gas flows upwardly through said filter bed and into said tank to dislodge particles from said filter bed;
f. discontinuing said forcing step;
g. opening said filtered effluent outlet;
h. again allowing said effluent to filter through said filter bed, into said underdrain cavity through said filtered effluent outlet; and,
i. substantially later, forcing liquid upwardly through said filter bed for backwashing said bed.

38. A method of operating a filter for a single filter run, said filter including a filter bed of particulate matter, said filter bed having an upper surface, and an underdrain chamber generally below said filter bed, said method comprising the steps of:
a. initially filtering a waste effluent through said filter bed into said chamber in a first direction;
b. forcing gas from said chamber upwardly through said filter bed in a second direction generally opposite to said first direction;
c. discontinuing said forcing step;
d. continuing filtering said waste effluent through said filter bed in said first direction;
e. then, terminating said filter run by backwashing said filter bed including the step of forcing at least some liquid upwardly through said filter bed in said second direction; and,
f. repeating said gas forcing step, discontinuing and continuing step in order for a predetermined number of times prior to said terminating step.

39. In a waste effluent filter comprising a filter tank, a layer of particulate material in said tank and forming a filter element having an upper surface, means forming an underdrain cavity generally below said filter element, an effluent inlet above said surface, a filtered effluent outlet connected to said underdrain cavity, a pumping means for pumping liquid into said underdrain cavity and upwardly through said filter element, a first level sensing means for sensing when liquid above said surface is at a given level, and means responsive to said first level sensing means for energizing said pumping means when the liquid level reaches said given level to thereby backwash said filter element, the improvement comprising: second level sensing means for sensing when liquid above said surface is at a preselected first level, a third level sensing means for sensing when liquid above said surface is at a preselected second level higher than said first level, timer means for measuring the time between sensing of said first level by said second level sensing means and sensing of said second level by said third level sensing means, said timer means having means for creating a signal when said measured time is less than a preselected time, and means responsive to creation of said signal for forcing air from said underdrain and into said tank.

40. The improvement as defined in claim 39 including means adjacent said upper surface for creating currents within a body of effluent above said surface whereby particles dislodged by said forcing means tend to stay in suspension.

41. The improvement as defined in claim 40 wherein said current creating means includes means for introducing air bubbles into said effluent above said upper surface.

42. The improvement as defined in claim 41 wherein said bubble introducing means is a diffuser adjacent said upper surface.

* * * * *